June 13, 1961 E. N. BOYLES 2,988,374
KNEE-ACTION DEAD AXLE WHEEL SUSPENSION
Filed June 24, 1960 2 Sheets-Sheet 1

INVENTOR.
ELMO N. BOYLES
BY
McMorrow, Berman & Davidson
ATTORNEYS

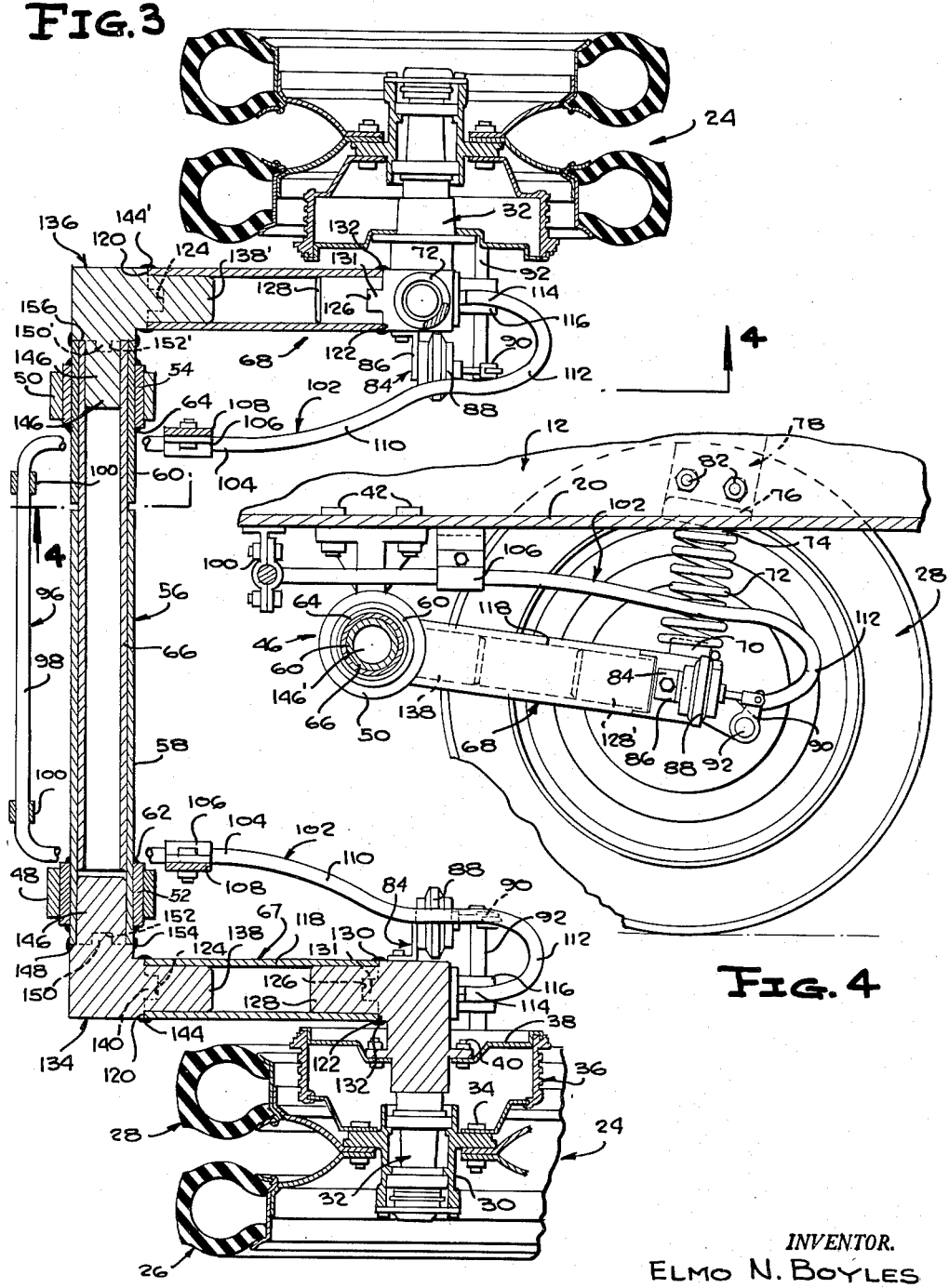

United States Patent Office
2,988,374
Patented June 13, 1961

2,988,374
KNEE-ACTION DEAD AXLE WHEEL
SUSPENSION
Elmo N. Boyles, P.O. Box 951, Orlando, Fla.
Filed June 24, 1960, Ser. No. 38,466
6 Claims. (Cl. 280—124)

This invention relates to a novel and improved knee-action dead axle vehicle wheel suspension for trailers and truck tractors, having individual trailing axles.

The primary object of the invention is the provision of a more efficient, lighter weight, and more durable dead axle suspension of the kind indicated, which provides the following advantages:

(1) Easier riding of the vehicle;
(2) Longer tire life;
(3) Elimination of pitching of vehicle from side to side on rough roads;
(4) Elimination of weight transfer between axles;
(5) Elimination of excessive axle roll;
(6) Elimination of unsprung weight;
(7) Makes available substantially total ground adhesion of the tires at opposite sides of the suspension for braking torque when brakes are applied;
(8) The weight of two of the suspensions is less than the combined weight of two conventional axles and of a tandem associated therewith.

Another object of the invention is to provide a suspension of the character indicated above wherein torsion bar means is provided to reduce or eliminate vagrant axle movements, in conjunction with individual air or spring cushions for the axles.

A further object of the invention is to provide, in a suspension of the character indicated above, novel and improved constructions and assemblies of the components of the individual trailing axles, wherein tubular members are welded together and have interlocking elements which, after the welding, positively preserve the predetermined alignments of the members and prevent relative rotation thereof.

Other important objects and advantageous features of the invention will be apparent from the following description and the accompanying drawings, wherein, for purposes of illustration only, a specific form of the invention is set forth in detail.

In the drawings:

FIGURE 3 is an enlarged fragmentary horizontal section taken on the line 3—3 of FIGURE 1; and, FIGURE 4 is a fragmentary vertical longitudinal section taken on the line 4—4 of FIGURE 3, interior portions of an axle component being shown in phantom lines.

Figure 1:
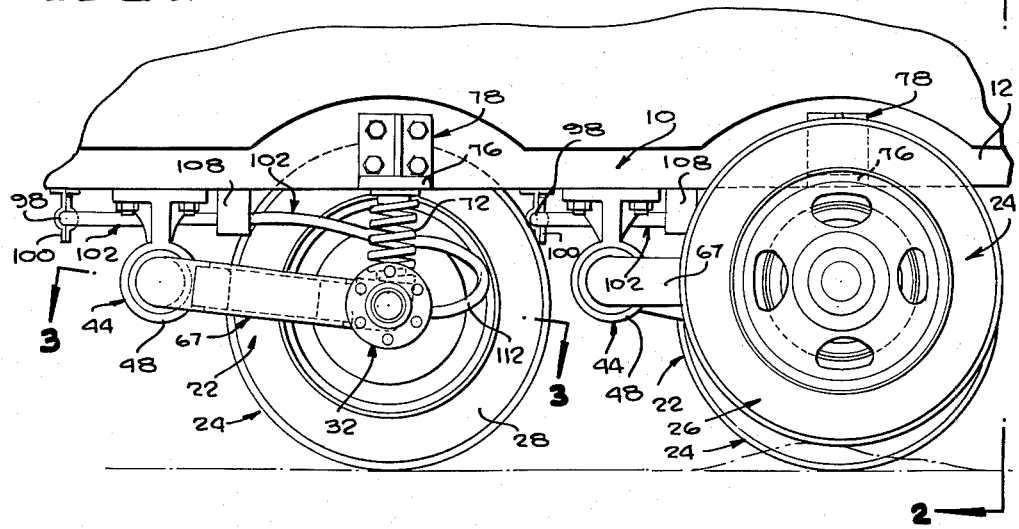
FIGURE 1 is a fragmentary side elevation of a trailer vehicle equipped with two suspensions of the present invention, a wheel of the front suspension being removed, and interior portions of components of an axle being shown in phantom lines, and the near wheel of the rear suspension being shown elevated, above the far wheel of the rear suspension, in passing over a road hump.

Referring in detail to the drawings, wherein like numerals designate like parts throughout the several views, the numeral 10 designates a horizontal chassis frame, of a vehicle such as a truck tractor or trailer, having parallel spaced channel side members 12, connected by cross members 14, the side members 12 having vertical webs 16 and laterally inwardly extending horizontal top and bottom flanges 18 and 20, respectively. While two knee-action dead axle suspensions, generally designated 22, are herein shown as mounted to the chassis frame 10, it will be understood that a simple suspension or three suspensions are contemplated.

The suspensions 22 are similar and are longitudinally spaced from each other along the chassis frame 10. Each suspension 22 comprises two dual wheel assemblies 24, composed of an outer wheel 26 and an inner wheel 28, mounted to a common hub 30, through which the wheel spindle 32 is journalled and secured in suitable manner. Fixed, as indicated at 34, to and extending inwardly from the hub 30 is a brake drum 36, and engaged in the inner end of the brake drum 36, is a brake shield 38 which is mounted on and fixed to the spindle 32, as indicated at 40.

Fixed, as indicated at 42, to the underside of the bottom flanges 20 of the chassis frame side members, at locations spaced forwardly from the wheel assemblies 24, are downwardly extending trunnion hanger brackets 44 and 46 which have journals 48 and 50 on their lower ends, in which annular bearings 52 and 54, respectively, turn, and which are fixed around components of a trunnion 56.

As shown in FIGURE 3, the trunnion 56 comprises a relatively long outer tube 58 and a short outer tube 60, on which the bearings 52 and 54, respectively, are welded, as indicated at 62 and 64, with the inner ends of these tubes being spaced from each other; and a single inner tube 66, longer than either of the outer tubes, which is journalled in the outer tubes. Fixed on the left-hand end of the long outer tube 58 and the right-hand end of the inner tube 66, are left- and right-hand trailing spindle arms 67 and 68, respectively, the spindles 32 being fixed on and extending laterally outwardly from the rear ends of the arms 67 and 68.

Fixed on the junctures of the arms 67 and 68 and the spindles 32, are upstanding spring seats 70 over which are securably engaged the lower ends of upstanding helical springs 72, whose upper ends are securably engaged on downwardly extending spring seats 74 on the undersides of the laterally outwardly extending horizontal flanges 76 of spring brackets 78, having vertical flanges 80 fixed, as indicated at 82, to the outer sides of the webs 16 of the chassis side members 12. As shown in FIGURE 4, the flanges 76 of the spring brackets 78 are slightly canted rearwardly and are positioned slightly rearwardly out of perpendicular alignment with the lower spring seats 70, so that the springs 72 are correspondingly canted upwardly and rearwardly, so that the springs can better follow the arcuate upward and downward swings of the spindles 32.

Laterally inwardly extending brackets 84 are fixed, as indicated at 86, to the inward ends of the spindles 32 and carry pneumatic brake actuating chambers 88 which are articulated, as indicated at 90, to the inward ends of rotary brake shoe actuating shafts 92, which are journalled through pendant brackets 94 on the undersides of the spindles, and extend through the brake drum shields 38, and are connected, at their outer ends, to brake shoes (not shown) located in the brake drums 36.

Because of the free rotating assembly of the inner and outer components of the trunnion 56, the spindle arms 67 and 68, together with the spindles 32, and the wheel assemblies 24, are free to swing upwardly and downwardly independently of each other and be variantly cushioned by the individual coil springs 72, in the usual well-understood manner of independent wheel suspensions. For controlling and resiliently coordinating the free individual movements of the wheel assemblies, in a manner to reduce or eliminate side-sway of the chassis frame 10, as when the vehicle negotiates turns and rough road surfaces, and excessive travel of the wheel assemblies, or axle-roll, the springs 72 are supplemented by a simple compound torsion bar 96.

Figure 2:
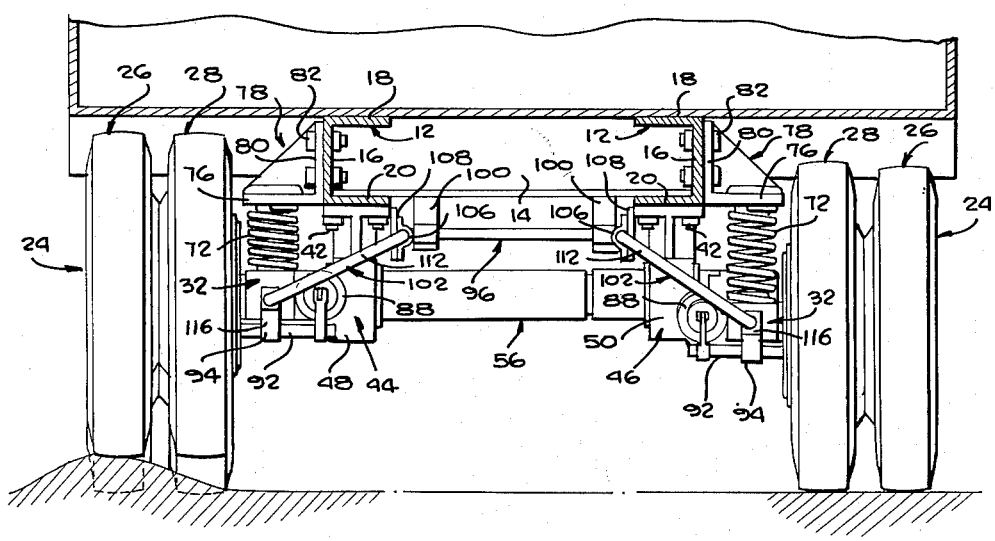
FIGURE 2 is a fragmentary vertical transverse section taken on the line 2—2 of FIGURE 1, showing the left-hand wheel assembly elevated by a road hump.

As shown in FIGURES 2, 3 and 4, the torsion bar 96 comprises a straight horizontal bight portion 98 which is located beneath the chassis frame 10 and between its side members 12, and is journalled, at its ends, in pendant brackets 100 fixed to the underside of a chassis frame cross member 14, at a location forward of and parallel to the trunnion 56. Fixed on the ends of the bight portion 98, outside of the brackets 100, are rearwardly extending torsion arms 102. The torsion arms 102 have straight forward portions 104, normal to the bight portion 98, which are journalled frictionally through brackets 106 which are fixed to the laterally inward sides of brackets 108 which are fixed to and depend from the bottom flanges 20 of the chassis frame side members 12, at locations near to and behind the trunnion 56. The forward torsion arm portions 104 merge, at their rear ends, into laterally outwardly and rearwardly extending intermediate portions 110, which terminate in U-shaped rear portion 112. The U-shaped rear portions 112 are canted laterally outwardly and downwardly relative to the intermediate portions 110, and have forwardly extending ends 114 which are secured in mounts 116 which are fixed to and extend rearwardly from the rear sides of the spindles 32 at the inner ends thereof. This arrangement of the torsion bar 96, in conjunction with the fixed axis journalling of the spindle arms 67, 68 by the trunnion 56 and the hangar brackets 44, 46, desirably limits the up and down independent swinging of the wheel assemblies 24 on arcs, wherein the independent swings of the wheel assemblies are sufficiently mutually and resiliently cancelled that side-sway of the vehicle is prevented or reduced. Further, the described torsion bar arrangement prevents excessive spindle swing, and hence diving or heeling of the vehicle should the vehicle be backed into an abutment, such as a loading platform.

The following construction and assembly features of the spindles 32, the spindle arms, and the trunnion components, made feasible the use of lightweight spindle arms 67 and 68, whereby their unsprung weight, as well as overall weight of the suspensions, are reduced below those of comparable conventional suspensions and suspension components, besides obtaining unusual strength and twist resistance.

The spindle arms 67 and 68 are similar and comprise single tubes 118 having open forward ends 120 and open rear ends 122, in which are formed locking notches 124 and 126, respectively. The spindles 32 have, at their inner ends, forwardly extending reduced cylindrical solid shanks 128, defining shoulders 130 which abut the rear ends 122 of the tubes 118, with the shanks inserted therein, the shanks 128 having lateral locking lugs 131 which fit and interengage with the notches 126, whereby the shanks 128 are locked in the rear ends, against rotation relative to the tubes 118, the rear ends 122 thereof being welded to the spindles 32, as indicated at 132.

The tubes 118 are assembled, at their forward ends, to the related tubular components of the trunnion 56, by means of similar solid left- and right-hand elbows 134 and 136, respectively. The left-hand elbow 134, related to the left-hand spindle arm 67, has a reduced diameter rearwardly extending shank 138 which is engaged in the forward end 120 of the tube 118 and is locked therein by a lateral lug 140 engaging the notch 124 in the tube, the shank 138 being welded, as indicated at 144, to the forward end of the tube. The elbow 134 further comprises a laterally inwardly extending reduced diameter shank 146 which is inserted in the left-hand end 148 of the long outer tube 58 of the trunnion 56, is locked therein by a lateral lug 150 engaged in a notch 152 in the tube 58, and is welded thereto, as indicated at 154.

The right-hand elbow 136 has a rearwardly extending reduced diameter shank 138' which is locked in and welded to the forward end 120 of the right-hand spindle arm tube 118, as indicated at 144'; and has a laterally inwardly extending reduced diameter shank 146' which is inserted in and locked in the right-hand end 156 of the inner trunnion tube 66, as indicated at 150', 152'. The insertions of the various shanks in the tube ends are preferably pressed fits.

While there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A knee-action dead axle vehicle wheel suspension comprising a horizontal chassis frame having spaced longitudinal side members and forward and rear ends, first and second hanger brackets fixed on said side members, a trunnion extending between said hanger brackets, said trunnion comprising an inner tube, a outer tube receiving and journalled on said inner tube, the tubes being severally journalled through said brackets, horizontal spindle arms severally fixed to the tubes and extending rearwardly therefrom, laterally outwardly extending spindles fixed on the rear ends of the spindle arms, wheel assemblies journalled on said spindles, vertical spindle cushions compressed between and severally fixed to the spindles and portions on the chassis frame side members, a torsion bar comprising a bight portion extending crosswise of the chassis frame and having rearwardly extending torsion arms, said torsion arms having downwardly canted rear portions fixed to the spindles, and means mounting said bight portion to the chassis frame.

2. A knee-action dead axle vehicle wheel suspension comprising a horizontal chassis frame having spaced longitudinal side members and forward and rear ends, first and second hanger brackets fixed on said side members, a trunnion extending between said hanger brackets, said trunnion comprising an inner tube, an outer tube receiving and journalled on said inner tube, the tubes being severally journalled through said brackets, horizontal spindle arms severally fixed to the tubes and extending rearwardly therefrom, laterally outwardly extending spindles fixed on the rear ends of the spindle arms, wheel assemblies journalled on said spindles, vertical spindle cushions compressed between and severally fixed to the spindles and portions on the chassis frame side members, a torsion bar comprising a bight portion extending crosswise of the chassis frame and having rearwardly extending torsion arms, said torsion arms having downwardly canted rear portions fixed to the spindles, and means mounting said bight portion to the chassis frame, said bight portion being positioned on a level above said trunnion and below the chassis frame and forwardly of the trunnion, rear portions of the torsion arms being U-shaped and located behind the spindles, said rear portions having forwardly extending free ends fixed to the rear sides of the spindles, and means rotatably supporting said torsion arms on the chassis frame side members.

3. A knee-action dead axle vehicle wheel suspension comprising a horizontal chassis frame having spaced longitudinal side members and forward and rear ends, first and second hanger brackets fixed on said side members, a trunnion extending between said hanger brackets, said trunnion comprising an inner tube, an outer tube receiving and journalled on said inner tube, the tubes being severally journalled through said brackets, horizontal spindle arms severally fixed to the tubes and extending rearwardly therefrom, laterally outwardly extending spindles fixed on the rear ends of the spindle arms, wheel assemblies journalled on said spindles, vertical spindle cushions compressed between and severally fixed to the spindles and portions on the chassis frame side members, a torsion bar comprising a bight portion extending crosswise of the chassis frame and having rearwardly extending torsion arms, said torsion arms having downwardly canted rear portions fixed to the spindles, and means mounting said bight portion to the chassis frame, said bight portion being positioned on a level above said trunnion and below the chassis frame and forwardly of the trunnion, said rear portions of the torsion arms being U-shaped and located behind the spindles, said rear portions having forwardly extending free ends fixed to the rear sides of the spindles, and means rotatably supporting said torsion arms on the chassis frame side members, at the laterally inward sides thereof.

4. A knee-action dead axle vehicle wheel suspension comprising a horizontal chassis frame having spaced longitudinal side members and forward and rear ends, first and second hanger brackets fixed on said side members, a trunnion extending between said hanger brackets, said trunnion comprising an inner tube, an outer tube receiving and journalled on said inner tube, the tubes being severally journalled through said brackets, horizontal spindle arms severally fixed to the tubes and extending rearwardly therefrom, laterally outwardly extending spindles fixed on the rear ends of the spindle arms, wheel assemblies journalled on said spindles, vertical spindle cushions compressed between and severally fixed to the spindles and portions on the chassis frame side members, a torsion bar comprising a bight portion extending crosswise of the chassis frame and having rearwardly extending torsion arms, said torsion arms having downwardly canted rear portions fixed to the spindles, and means mounting said bight portion to the chassis frame, said spindle arms comprising tubes having open forward and rear ends, locking notches in the ends of the tubes, said spindles having forwardly extending shanks at their inner ends engaged in the rear ends of the spindle arm tubes and having lateral locking lugs engaged in the notches in the rear ends of the spindle arm tubes, and welding securing the rear ends of the spindle arm tubes to the spindles.

5. A knee-action dead axle vehicle wheel suspension comprising a horizontal chassis frame having spaced longitudinal side members and forward and rear ends, first and second hanger brackets fixed on said side members, a trunnion extending between said hanger brackets, said trunnion comprising an inner tube, an outer tube receiving and journalled on said inner tube, the tubes being severally journalled through said brackets, horizontal spindle arms severally fixed to the tubes and extending rearwardly therefrom, laterally outwardly extending spindles fixed on the rear ends of the spindle arms, wheel assemblies journalled on said spindles, vertical spindle cushions compressed between and severally fixed to the spindles and portions on the chassis frame side members, a torsion bar comprising a bight portion extending crosswise of the chassis frame and having rearwardly extending torsion arms, said torsion arms having downwardly canted rear portions fixed to the spindles, and means mounting said bight portion to the chassis frame, said spindle arms comprising tubes having open forward and rear ends, locking notches in the ends of the tubes, said spindles having forwardly extending shanks at their inner ends engaged in the rear ends of the spindle arm tubes and having lateral locking lugs engaged in the notches in the rear ends of the spindle arm tubes, and welding securing the rear ends of the spindle arm tubes to the spindles, and elbows fixing the spindle arms to the outer and inner trunnion tubes, said elbows having rearwardly extending shanks fixed in the forward ends of the spindle arm tubes and laterally inwardly extending shanks fixed in the outer ends of the trunnion tubes.

6. A knee-action dead axle vehicle wheel suspension comprising a horizontal chassis frame having spaced longitudinal side members and forward and rear ends, first and second hanger brackets fixed on said side members, a trunnion extending between said hanger brackets, said trunnion comprising an inner tube, an outer tube receiving and journalled on said inner tube, the tubes being severally journalled through said brackets, horizontal spindle arms severally fixed to the tubes and extending rearwardly therefrom, laterally outwardly extending spindles fixed on the rear ends of the spindle arms, wheel assemblies journalled on said spindles, vertical spindle cushions compressed between and severally fixed to the spindles and portions on the chassis frame side members, a torsion bar comprising a bight portion extending crosswise of the chassis frame and having rearwardly extending torsion arms, said torsion arms having downwardly canted rear portions fixed to the spindles, and means mounting said bight portion to the chassis frame, said spindle arms comprising tubes having open forward and rear ends, locking notches in the ends of the tubes, said spindles having forwardly extending shanks at their inner ends engaged in the rear ends of the spindle arm tubes and having lateral locking lugs engaged in the notches in the rear ends of the spindle arm tubes, and welding securing the rear ends of the spindle arm tubes to the spindles, and first and second elbows fixing the spindle arms to the outer ends of the inner and outer trunnion tubes, said first elbow having a rearwardly extending shank engaged in the forward end of a spindle arm tube and having a lateral locking lug engaged in the locking notch thereat, welding connecting the first elbow to the tube of the first spindle arm, said first elbow having a laterally inwardly extending shank engaged in the outer end of the outer trunnion tube and having a lateral locking lug engaged in a locking notch in the outer tube, welding connecting the first elbow to said outer tube, said second elbow having a rearwardly extending shank engaged in the forward end of the tube of the second spindle arm and a lateral locking lug engaged in the locking notch thereat, said second elbow having a laterally inwardly extending shank engaged in the outer end of the inner trunnion tube and having a lateral lug engaged in a locking notch provided in the inner tube, and welding connecting the second elbow to the inner tube.

References Cited in the file of this patent

UNITED STATES PATENTS

| | | |
|---|---|---|
| 2,459,372 | Fraunfelder | Jan. 18, 1949 |
| 2,613,954 | Avila | Oct. 14, 1952 |
| 2,638,356 | Butterfield | May 2, 1953 |